United States Patent [19]

Mendala

[11] Patent Number: 4,589,120

[45] Date of Patent: May 13, 1986

[54] UNIQUE START BIT FOR DATA TRANSMISSIONS

[75] Inventor: John M. Mendala, Arlington Heights, Ill.

[73] Assignee: Honeywell Inc., Minneapolis, Minn.

[21] Appl. No.: 561,003

[22] Filed: Dec. 13, 1983

[51] Int. Cl.4 .................. H04L 25/38; H04L 5/24
[52] U.S. Cl. .................. 375/117; 370/48; 370/49
[58] Field of Search .......... 375/117, 113; 370/48, 370/49

[56] References Cited

U.S. PATENT DOCUMENTS

| | | | |
|---|---|---|---|
| 2,914,612 | 11/1959 | Davey et al. | 370/49 |
| 2,969,431 | 1/1961 | Robin | 370/49 |
| 3,363,059 | 1/1968 | Cummins | 370/49 |
| 4,249,254 | 2/1981 | Bodart et al. | 370/48 |

*Primary Examiner*—Douglas W. Olms
*Assistant Examiner*—Wellington Chin
*Attorney, Agent, or Firm*—Trevor B. Joike

[57] ABSTRACT

In a data transmission system, the start bit is arranged so that at least a portion thereof has a different time duration than a data bit so that the data bit and start bit can be easily distinguished.

10 Claims, 11 Drawing Figures

UNIQUE START BIT FOR DATA TRANSMISSIONS

BACKGROUND OF THE INVENTION

The present invention relates to data transmission systems in which the start bits of messages being transmitted by stations within such systems have a characteristic which allows them to be easily distinguished from data bits in the messages and, more particularly, to such systems in which a start bit has at least a portion of a time duration different than a data bit so that a start bit can be easily distinguished from a data bit.

Computer technologies involving data processing and data transmission have been adapted for use in building control and supervision because they offer advantages and economies which building control systems had not theretofore achieved. The prior art building control and supervision systems for maintaining comfort control and for monitoring fire and security points within the building were not able to easily minimize energy consumption in maintaining desired comfort levels nor minimize installation and hardware costs in wiring the central control function to the various loads being monitored and controlled. Instead of wiring the control function to each load separately and instead of requiring excessive amounts of hardware to achieve energy management functions, the modern building control system uses computer technology for connecting the various loads of a building over a single channel to the central control function and uses software and/or digital technology for achieving energy management control.

In a system comprising a central control station connection over a single communication channel to a plurality of remote stations, each station has a unique address and communicates with other stations by transmitting digital messages each having an address portion specifying the particular station to which the message is directed to receive and process the message. The message will also have other portions, such as control and data portions, which may be utilized to require the addressed station to perform certain functions such as providing a status report, answer a polling message with any alarm messages which it may have to transmit to the central controller, requiring a remote station to perform a control function such as turning loads on or off, as well as requiring a wide variety of other functions.

In a typical data transmission system of this nature, any message transmission is begun with a start bit or a start sequence to inform the receiving stations that a message transmission is beginning. Prior art systems constructed start bits in much the same fashion as they constructed data bits, i.e. from one or more bits which could not be easily distinguished from data bits. As a result, data processing systems on occasion generated errors through confusing data bits with start bits. Thus, it was possible for such a system to interpret a start bit as a data bit resulting in the processing operation at the receiving station becoming unsynchronized to the data bits in the message which it was processing at the time. Likewise, it was possible for such a station to interpret a data bit as a start bit which again resulted in lack of synchronization between the specific bits making up the data message and the interpretation of those bits by the receiving station.

SUMMARY OF THE INVENTION

Accordingly, the present invention eliminates any possible confusion between the start bit or start bit sequence and data bits by creating a start bit which bears a fractional relationship with a data bit. Thus, the present invention is directed to a data transmission system having a central controller for transmitting and receiving messages, a plurality of remote control modules for transmitting and receiving messages, and a communication channel which connects the central controller and the plurality of remote control modules together wherein the central controller and each of the remote control modules will generate a start bit at the beginning of the message, at least a portion of the start bit having a time duration which distinguishes the start bit from a data bit and wherein the central controller and each of the remote control modules have detectors for distinguishing the start bit from data bits.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
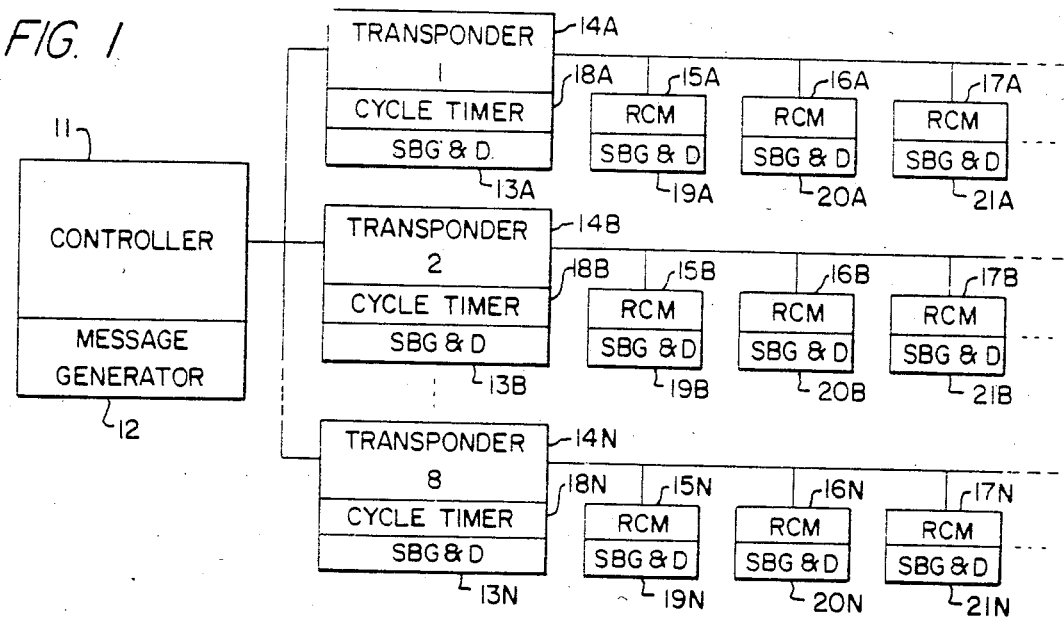
FIG. 1 shows a circuit schematic of the data processing system according to the present invention.

The system shown in FIG. 1 is particularly useful when the communication channel is selected to be power line carriers within a building although it is to be understood that the present invention may be used on systems other than power line carrier systems. The system comprises central controller 11 which directs the control and supervisory functions of a plurality of remote stations. Such functions can include energy management functions for controlling a building's air conditioning plant to establish and maintain the environmental conditions within a building at comfortable levels as well as alarm functions such as may involve the monitoring of fire and security points around the building. Controller 11, as is typical in systems of this nature, contains a message generation portion 12 for generating messages transmitted between controller 11 and its remote stations.

By way of example only, controller 11 can be connected to a plurality of transponders 14A, 14B and so on through 14N, with N in this particular example being selected as the number 8. Thus, eight transponders can be connected to controller 11. In this particular example, the system is designed to accommodate up to eight trasponders so that each transponder can channel messages between controller 11 and the associated remote stations over a corresponding power feed through a building. The system shown in FIG. 1 can handle up to eight power feeds to a building. If the building has only one power feed, then only one transponder is needed.

The connection between controller 11 and transponders 14 can, by way of example, be conducted over a 20 milliamp current loop.

Transponder A is then connected over the power lines in a power feed system to remote control stations or modules 15A, 16A, 17A and so on. Each of the other transponders is also connected by its respective power line system to a number of remote control modules as shown in FIG. 1.

Each transponder has a cycle timer portion 18 the function of which will be described hereinafter in connection with FIG. 9. Each transponder also has a start bit generation and detection portion 13 so that the associated transponder 14 in transmitting messages to the remote control module means can provide a start bit to be recognized by the remote control modules and can detect start bits of messages initiated by the remote control modules. Similar to transponders 14A–14N, each remote control module has a message generating portion 19, 20, 21 and so on for generating messages and for providing start bit generation and detection.

Controller 11, transponders 14 and remote control modules 15–17 can each contain a microcomputer for more easily performing the control functions necessary to such a system. The transponder microcomputer can be arranged to control both the current loop receive and transmit function between controller 11 and the transponder, and the power line carrier receive and transmit function between the transponder and the remote control modules connected to it over its associated power line, as well as error detection and any desired housekeeping information functions. The remote control module microcomputer controls power line carrier receive and transmit functions, performs error detection, and controls analog and digital input sensing and output control as well as any desired housekeeping functions.

Such systems are familiar in the arts and need not be elaborated on here except to show the particular message construction which is provided by the apparatus shown in FIG. 1 and to explain how the start bit in the message can be distinguished from data bits.

Figure 2:
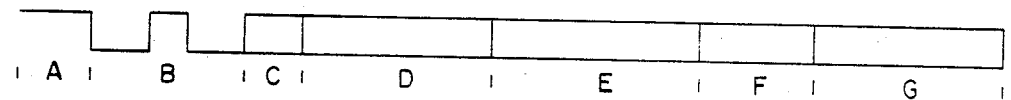
FIG. 2 shows a message which can be transitted between the controller and the remote control modules of FIG. 1, the message having a start bit portion B.

The message which can be transmitted between the transponders and remote control modules may take the form shown in FIG. 2. This message may have a portion "A" which is simply a portion for conditioning the transmission line and which may have a duration of 1 bit time.

Portion "B" is a start bit to inform receiving stations that a data transmission is beginning. For purposes of the present invention, a start bit is defined as either a single bit or a multiple bit sequence used to define the start of a data transmission.

Portion "C" is a direction bit, which may be only 1 bit in length, for indicating the direction of the message. One remote station, depending upon system configuration, need not read messages which are being transmitted from another remote station to the central controller 11. Bit C can perform this function.

Portion "D" contains a function code and can include 7 bit times for indicating the particular function of the message. The message could be a poll message, a control message, a status report message, an information message or the like.

Portion "E" is an address portion which may be 8 bits in duration defining the address to which a particular message is directed.

Portion "F" is a point number field. This portion is used for transmissions from controller 11 to remote control modules and contains a number of bits to define the specific point controlled or supervised by a remote control module which is to perform some function as directed by the controller 11.

Finally, portion "G" is a multibit cyclic redundancy character error checking portion.

Figure 3:
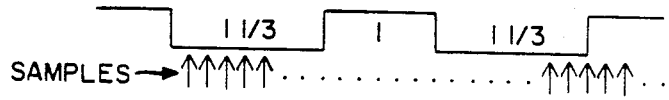
FIG. 3 shows the start bit portion B of the message in FIG. 2 in more detail.

The start bit is shown in more detail in FIG. 3. At least a portion of the start bit has a duration which is of a different length in terms of time from a data bit. The start bit can be a single bit, i.e. a continuous signal level bounded by two opposite signal transitions, having a duration which is fractionally rather than integrally related to a data bit. For example, the start bit may be a zero having a length which is $\frac{1}{2}$, $\frac{2}{3}$, 4/3 or the like of a data bit. Accordingly, the start bit may have a duration which is n/m again as long as a data bit where m>n or m<n but not m=n. Thus, the receiving station can measure the length of time of the bits received and determine when a start bit is received and can then distinguish that start bit from data bits.

However, an extra level of protection can be obtained from the particular example shown in FIG. 3, wherein the start bit is in actuality a sequence of three individual bits because this bit pattern can be more easily discernible by the receiving station. The first and third individual bits have a length which is $1\frac{1}{3}$ as long as a data bit and a second intermediate bit which is of the same length as a data bit. The overall bit is therefore $3\frac{2}{3}$ the length of a normal data bit.

In prior art systems, receivers typically recognize bits by sampling in the middle of a bit time to determine whether it has received a 0 or a 1. In the case of the start bit shown in FIG. 3, such a prior art system will not be able to distinguish between a bit which has a fractional relationship to a data bit. Accordingly, multiple samples of incoming bits must be taken in order to determine whether this fractional relationship has occurred. As shown in FIG. 3, the multiple samples will indicate that the start bit does bear a fractional relationship to a data bit.

Figure 4:
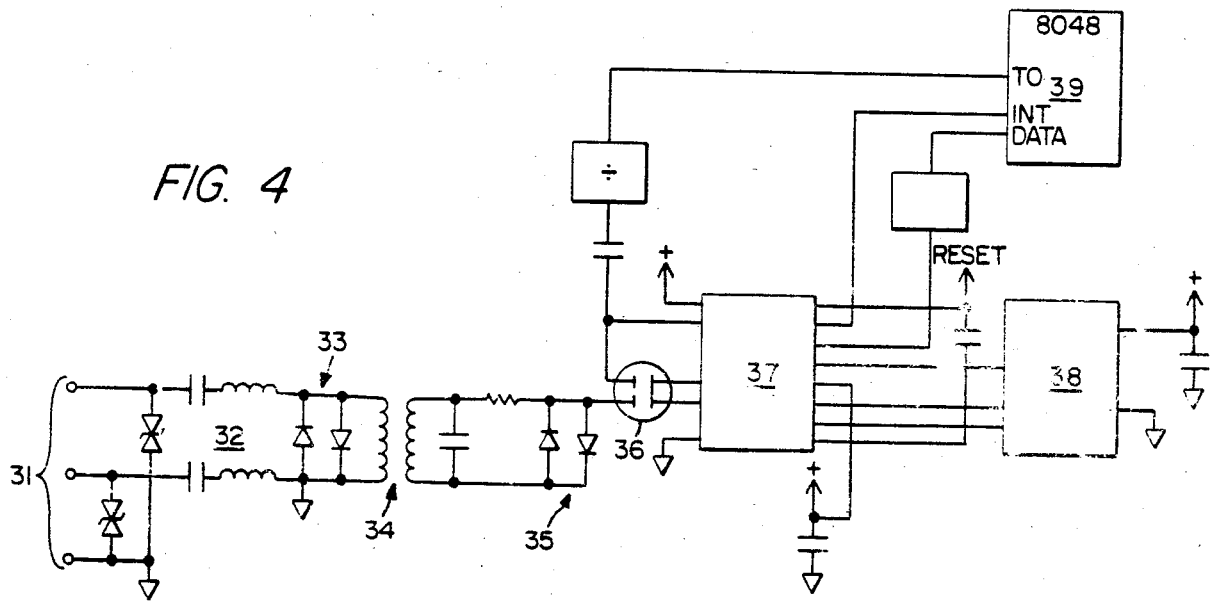
FIG. 4 shows an arrangement wherein the microprocessor of either the transponder or the remote control module can sample the bits received to distinguish a start bit from a data bit.

FIG. 4 shows a circuit apparatus which can be used at both the transponder and at the remote control modules for start bit detection. The terminals 31 are connected to the power line to which the particular station is associated and a filtering section 32 is provided for filtering out the 60 cycle power line current. Only system messages should be present past the filter section 32. Clipping diodes 33 are provided for clamping the received signal and step-up transformer 34 is provided for bandpass filtering. Additional diodes 35 are provided for additional limiting with the received signal being supplied to mixer 36. The mixed signal is amplified and further limited by circuit 37 and connected to circuit 38 which provides active filtering at the mixed down frequency-shift-keying frequencies chosen for transmission. The signal is then connected back from device 38 to device 37 for detection and is then supplied to microprocessor 39. One output of circuit 37 is connected to the interrupt terminal of processor 39 and the other output from device 37 is connected to the data input terminal of device 39.

As shown in FIG. 3, microprocessor 39 repetitively samples the information at its interrupt terminal. Microprocessor 39, because of this multiple sampling, can then distinguish a start bit such as that shown in FIG. 3 from normal data bits. Since the start bit bears a fractional relationship to data bits, it will not be confused between the start bit and a data bit.

When controller 11 requests a group poll of remote stations, it issues a message similar to that shown in FIG. 2. In this case, the function code portion "D" will indicate a group poll and address portion "E" will contain an address defining the addresses of the remote stations in the group. In the specific example shown, an address unique to the remote station is stored in each remote station. This address is comprised of N bits which may in this example be 8 bits. Address field E also contains 8 bits. If there are trailing 0's, that is the contiguous 0's which occupy the lesser significant bits of the address portion in field "E" starting with the least significant bit, then the group being polled is defined as a range of addresses starting with the address in field "E" and ending with an address determined by changing all trailing 0's to 1's. In this way, a single word can define the entire range of addresses within the poll.

As examples, if the address in the polling message contains all 0's, then the low end of the range is as defined by the address, i.e. 00000000, and the high end is defined by changing all tailing 0's in the received address to 1, i.e. 11111111. If the received address is 01000000, then the range is defined on the low end by 01000000 and at the high end by 01111111. As a third example, if the received address is 10110111, then the range is defined on the low end by 10110111 (the received address) and at the high end by 10110111 (since there are no trailing "0's").

Figure 5:
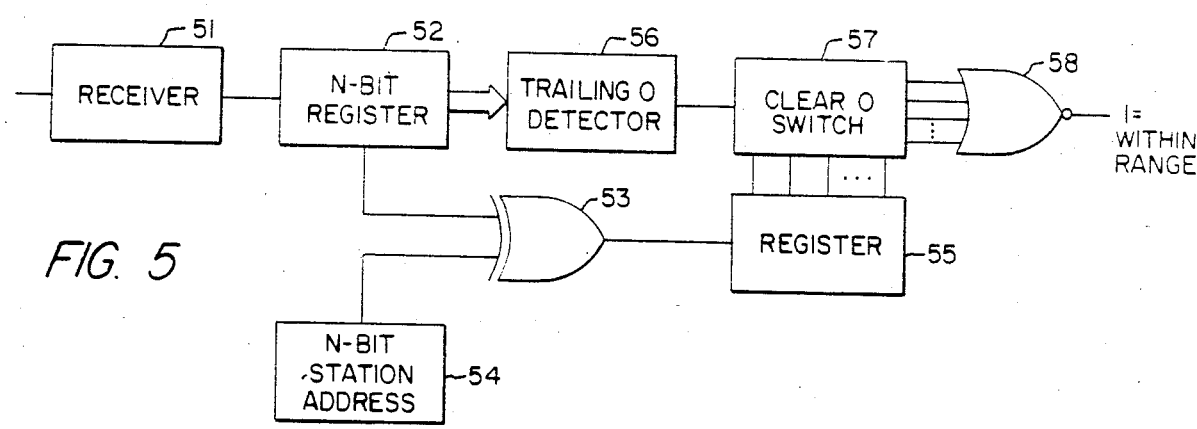
FIG. 5 shows a functional diagram wherein a station can determine if its address falls within the range defined by the address contained in a polling message.

Although this function may desirably be performed by the microcomputers in the remote control modules, FIG. 5 shows a functional block diagram of how a remote station can recognize whether its address is within the range of addresses relating to the group of stations or modules being polled.

The incoming message is received by receiver 51 of FIG. 5. The address is then shifted into an N bit register where N stands for the number of bits in the address. Each station has a unique address, also comprised of N bits. EXCLUSIVE OR 53 then compares the received address stored in N bit register 52 with the N bit station address stored in register 54, the result of the comparison being stored in EXCLUSIVE OR output register 55. Also, the parallel information stored in N bit register 52 is connected to trailing "zero" detector 56 which detects any trailing zeros and clears the corresponding bit positions in register 55 by use of a clear zero switch 57. The output from switch 57 is then connected as inputs to NOR gate 58 which will provide a "1" output only if all inputs are "0".

Thus, the EXCLUSIVE OR operation will compare the received address with the stored address bit by bit. Because of the EXCLUSIVE OR operation, for each bit position in which register 52 and register 54 contain the same bit value, EXCLUSIVE OR gate 53 will provide a "0". EXCLUSIVE OR gate 53 will only provide a "1" for those bit positions which have different bit values stored in register 52 and register 54. If trailing "0" detector clears those "1's" stored in register 55 corresponding to the trailing "0" bit positions of the address stored in register 52 and if only "0's" remain, the circuit of FIG. 5 has determined that the address stored in register 54 is within the range identified by the address stored in register 52. In this way, the functional apparatus shown in FIG. 5 determines whether the station address stored in register 54 is included within a range of addresses beginning with the address received in register 52 and ending with an address resulting from changing the trailing "0's" of the address stored in register 52 to "1's".

Figure 6:
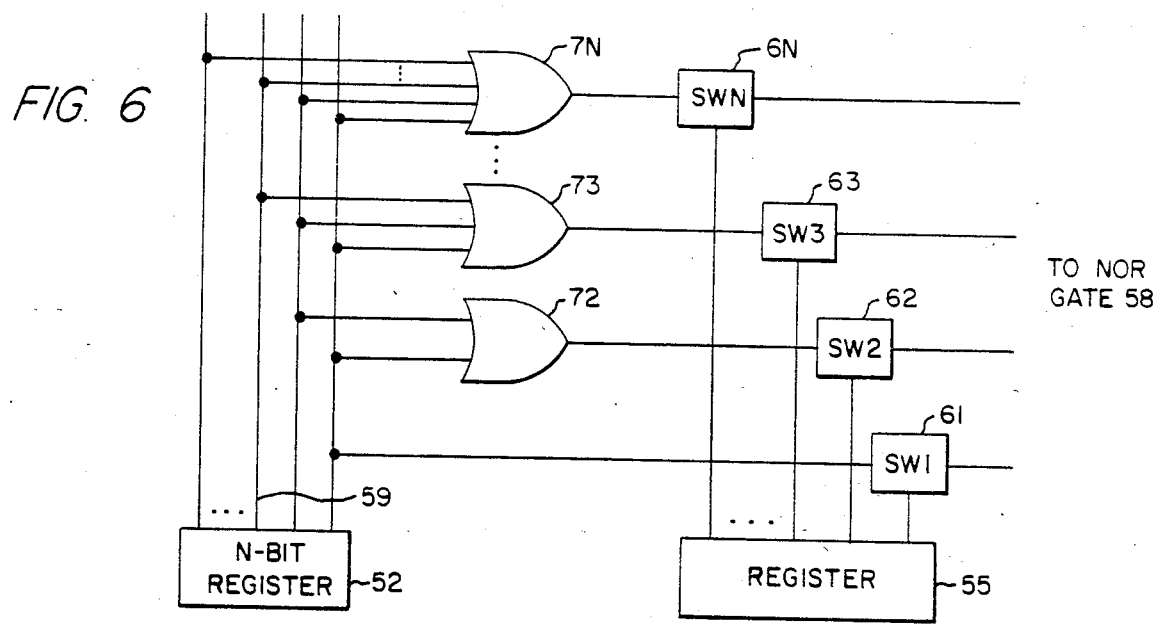
FIG. 6 shows the trailing "zero" detector of FIG. 5 in more detail.

FIG. 6 shows functionally how the trailing "0" detector 56 can operate. The outputs of registers 55 are connected to individual switches 61, 62, 63 to 6N. The least significant bit in the address stored in register 52 is connected directly to control switch 61. If this bit value is a "0", switch 61 will supply a "0" output to NOR gate 58 regardless of the value of the corresponding bit position from register 55. The least significant bit output from register 52 is "OR"ed by OR gate 72 with the next least significant bit and the output of OR gate 72 controls switch 62. If the two least significant bits from register 52 are both "0's", then the output from OR gate 72 is also a "0" and switch 62 insures a "0" output to NOR gate 58 regardless of the value of the corresponding bit position in register 55. As can be seen from FIG. 6, if any bit position in register 52 has a "1" output, its associated OR gate and all higher OR gates will have a "1" output operating the corresponding switches to connect the corresponding outputs of register 55 to NOR gate 58. In this way, the bit positions in register 55 corresponding to the trailing "0" positions stored in register 52 will be cleared with the remainder of the outputs from register 55 being connected to the input of NOR gate 58 as is. If any of these outputs have a "1", then there is no match between the address received and the station address and, thus, the station will not respond to the poll.

Switches 61–6N can be two position switches. In the first position, the corresponding input to NOR gate 58 is connected to ground; this position results from a zero input to the switch. In the other position, the corresponding input to NOR gate 58 is connected to its associated output from register 55; this position results from a one input to the switch.

As an example of this operation, if a poll address of 11011000 is received by a remote station having an address of 11011100, an EXCLUSIVE OR is performed to obtain 00000100. The "1" in this result is supplied as an input to switch 63. However, since there are three contiguous trailing "0's", the OR gates 72 and 73 provide "0" outputs so that the control inputs to switches 61–63 are all "0". Thus, the "1" input to switch 63 is cleared and NOR gate 58 has all "0" inputs determining that the address of the remote device falls within the specified range. As another example, if the address in the polling message is 11011010 and the remote device has an address of 11011100, the EXCLUSIVE OR operation results in 00000110. Since there is only one trailing 0 in the address received, the last bit position of the EXCLUSIVE OR register is cleared and the remaining bit positions are used to determine whether there is a match. Since not all bit positions contain 0's, there is no match.

Figure 7:
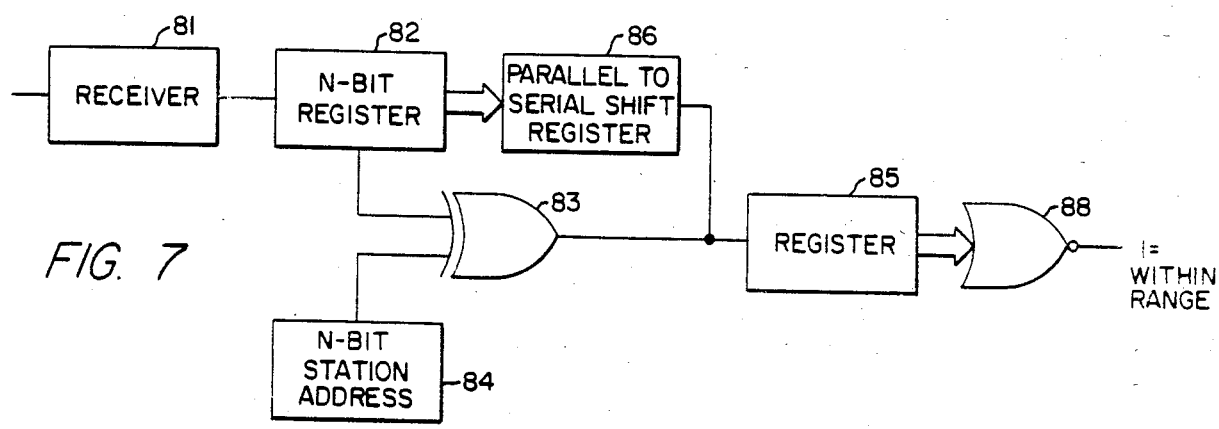
FIG. 7 shows an alternative arrangement for determining whether a station address falls within the range established by the address contained in the polling message.

FIG. 7 shows an alternative method for determining whether a station address is between the address received and an address resulting from converting any and all trailing "0's" of the received address to "1's". The functional alternative represented by the circuit of FIG. 7 takes any trailing "0's" in the received addresses and shifts them into that end of the EXCLUSIVE OR register having the most significant bit. In this manner, the number of least significant bits shifted out of the EXCLUSIVE OR register will be the same as the number of trailing "0's".

Thus, as shown in FIG. 7, the received address is received in receiver 81 and stored in N bit register 82. EXCLUSIVE OR gate 83 compares this received address with the stored address in register 84 with the output of the comparison being stored in EXCLUSIVE OR register 85. Then, a parallel to serial shift register 86 will shift the trailing "0's" stored in register 82 into register 85. The outputs of register 85 are then connected as inputs to NOR gate 86 with a result similar to the apparatus shown in FIGS. 5 and 6.

As an example of this operation, if the poll address is 11011000 and the station address is 11011100, the EXCLUSIVE OR is performed to obtain 00000100. The first trailing zero is shifted into this result to obtain 00000010, the next to obtain 00000001, and the third to obtain 00000000. Since all positions are "0", there is a match.

As another example, if the poll address is 11011010 and the station address is 11011100, the EXCLUSIVE OR is performed to obtain 00000110. Since there is only one trailing "0" in the poll address, only one "0" is shifted into the EXCLUSIVE OR result yielding 00000011. Because not all bit positions contain a "0", NOR gate 58 will indicate that the station address is outside of the poll addresses.

Since the system shown in FIG. 1 can handle up to 8 transponders, more than one transponder can receive a message from their associated remote control modules because either alarms can occur on more than one power feed at the same time or, since transformers vary in the isolation at the particular frequencies used for transmission, an alarm message sent on one power feed potentially can be detected by both the transponder on the power feed on which the alarm originated and a transponder on another power feed because of the poor isolation. The present system provides a slotted contention arrangement for allowing plural transponders which have messages to report to communicate with the controller.

In this system, the transponder having the highest priority is given the lowest number and the transponder having the lowest priority is given the highest number with the remaining transponders prioritized therebetween.

When the transponders receive a message from the controller, they transmit that message on their respective power feed simultaneously. At the time each transponder finishes this retransmission, it sets a timer 18. This timer controls the time when the transponder may respond to the controller. The transponder having the highest priority is set to respond first, the transponder with the next highest priority is set to respond a short time delay after the transponder having the highest priority and so on with the transponder having the lowest priority set to respond last after the most time delay. If any transponder responds during its time slot, the remaining transponders detect that transmission to the controller. When one message is sent to the controller, the other transponders clear any pending messages and wait for the next message outbound from the controller.

Figure 8:
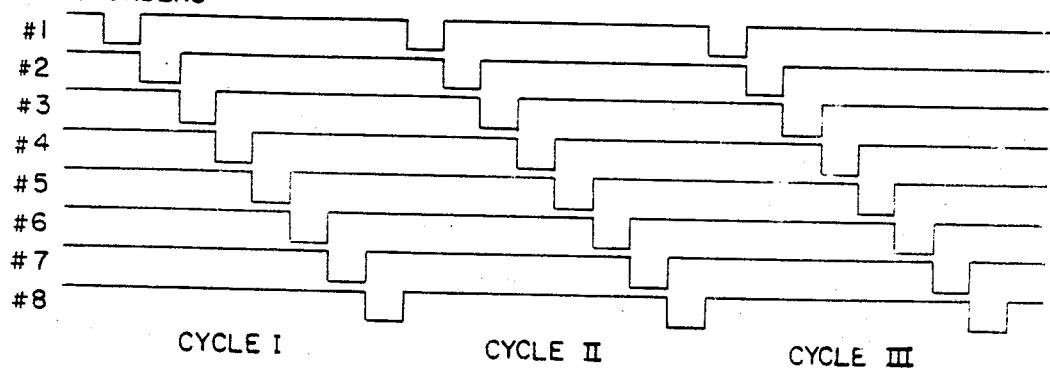
FIG. 8 shows an operation in which the transponder shown in FIG. 2 can convey messages from the remote control modules to the controller to resolve contentions between various transponders; and, FIGS. 9A–9C show one of the transponders in FIG. 1 in more detail.

FIG. 8 illustrates the sequence of time slots. When non-contention poll messages (i.e. poll messages for which contentions will not arise) are sent from the controller, only two cycles of slotted contention on the current loop between controller 11 and the transponders may be required. However, for "all poll" messages or for poll messages which may result in contention, three cycles may be required.

Each transponder then has a timing function which separates the three cycles and determines when messages are transmitted. The first cycle will report back good messages, i.e. non-garbled messages wherein only one of the remote control modules to which it is connected has responded. If transponder 1 has no good messages, for example, transponder 2 is then given the chance to respond with good messages and so on. However, once a transponder has transmitted a good message to the controller, other transponders having lower priority will not report their messages back on the current loop. At this point, the cycling terminates and the transponders wait for another message from the controller which may be another polling message to pick up the other transponder responses.

If none of the transponders have received a good message from their remote control modules, the slotted contention function then proceeds to the second cycle. For "all poll" messages, any transponder which received a garbled message will respond in the appropriately prioritized time slot. The controller upon receiving this message will then determine that there is contention and will operate through the transponders to resolve that contention by polling subgroups of remote control modules. If any transponder responds during this cycle, the remaining lower priority transponders clear their pending messages and wait to receive another message.

Cycle 3 is used in the case where no transponders have responded during cycles 1 or 2. At this point, the highest priority transponder will transmit back a no response message to the controllers. In this way, the failure time out delay, which is long to accommodate the worst case situation, need not be waited upon.

Figure 9B:
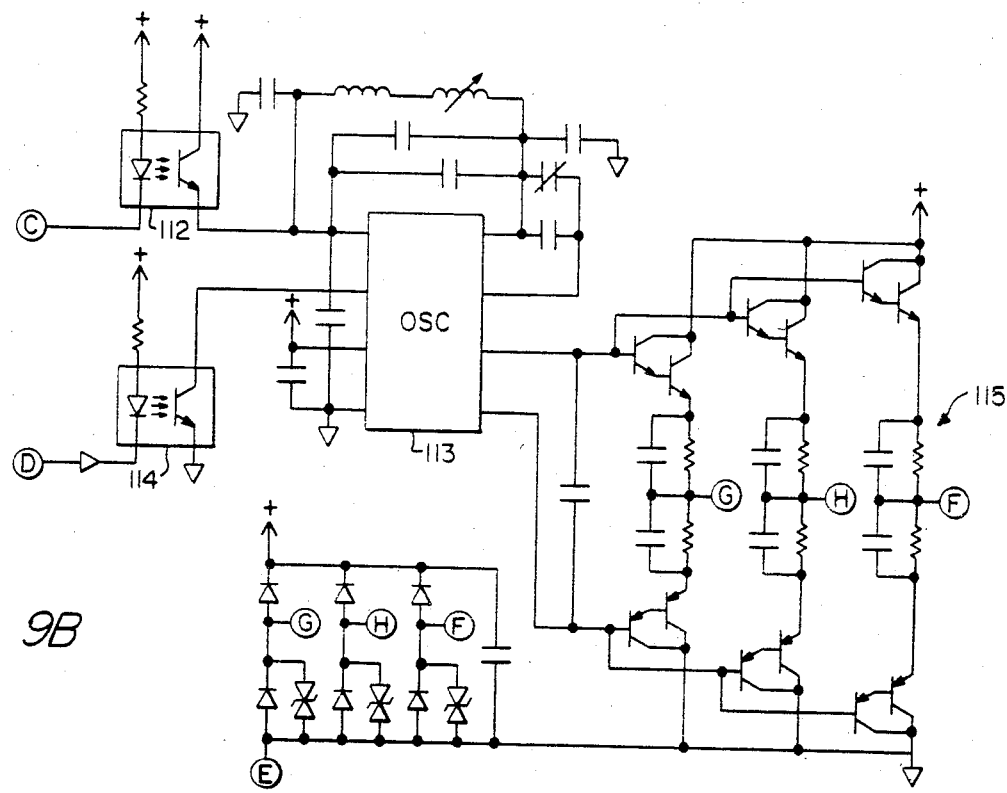
Figure 9C:
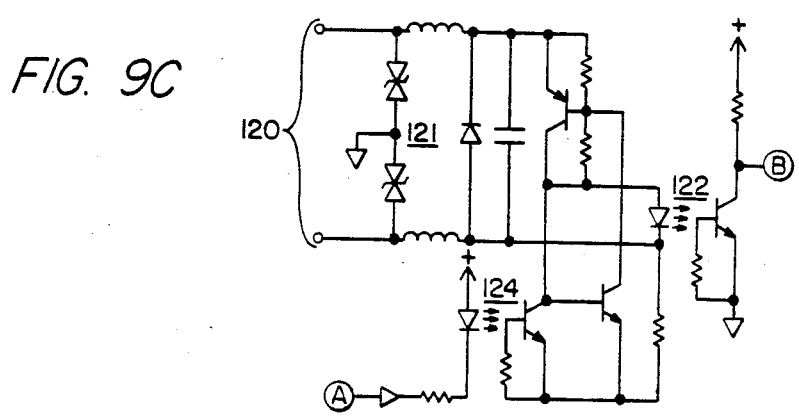
Figure 9A:
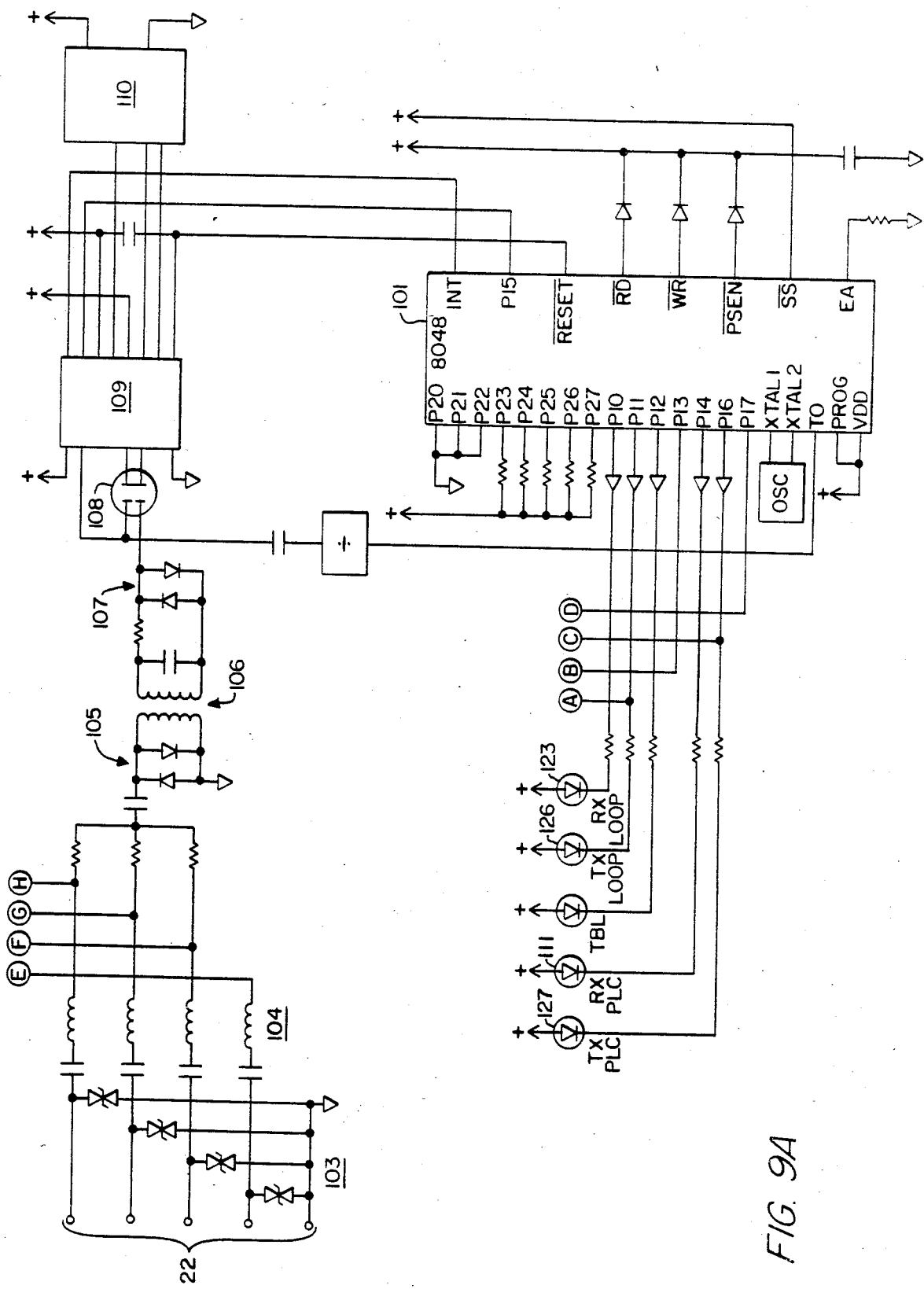

FIGS. 9A–9C show any one of the transponders in FIG. 1 in more detail. The heart of the transponder is the microprocessor 101 which is coupled both to receive and transmit over the current loop in connection with the central controller as well as over the power feed in connection with the remote control modules to which it is associated. Thus, terminals 102 are connected to the power feed for communication between the transponder and the remote control modules. The signals received on terminals 102 are supplied through protection break down devices 103. Filter section 104 provides blocking of the 60 hertz power signal. The communication messages are limited by diodes 105, filtered by transformer 106 and further limited by diodes 107. The signal is mixed by mixer 108, and amplified, limited and detected by circuit 109. Active filtering at the mixed down frequency is provided by circuit 110 and the output from the circuits are connected to the input interrupt terminal and the input P15 terminal of microprocessor 101.

When the transponder is receiving over the power lines, LED 111 will be flashed at pin P14 of microprocessor 101 to provide a visual indication of this mode of operation.

Data can be transmitted over the power line by microprocessor 101 by the circuit apparatus shown in FIG. 9B. In this case, the outputs from microprocessor 101 are connected over terminals C and D to the apparatus shown in FIG. 9B. Thus, terminal C from pin 16 of microprocessor 101 provides a transmit enable signal through opto-isolator 112 to the enabling input of oscillator 113 of FIG. 9B. The oscillator 113 then operates under the control of pin P17 of microprocessor 101 through terminal D and opto-isolator 114 to provide outgoing data through the Darlington transistors 114 to terminals F, G and H for transmission over the power lines through terminals 102 shown in FIG. 9A. LED 127 is provided to indicate that the transponder is transmitting over the power lines.

The transponder can also communicate with the central controller. The transponder is connected to the current loop between the transponder and the central controller by terminals 120 shown in FIG. 9C. Protection against voltage surges is provided by break down devices 121 and the signal is filtered and opto-isolated at 122 before it is supplied over terminal B to pin 13 of microprocessor 101. During reception of information over the current loop, LED 123 is flashed by control from P10 of microprocessor 101.

Microprocessor 101 through terminal A can also transmit information over the current loop to the central controller. In this case the information is connected through opto-isolator 124 to terminals 120 as shown for transmission over the current loop to the central controller. LED 126 is provided to give an indication that the transponder is transmitting over the current loop.

The embodiments of the invention in which an exclusive property or right is claimed are defined as follows:

1. A data transmission system wherein a start bit denoting the beginning of a message has a non-integral length as compared to a data bit time period in said message, the system comprising:
   central controller means for transmitting and receiving messages;
   remote control module means for transmitting and receiving messages;
   communication means connecting said central controller means to said remote control module means for carrying said messages between said central controller means and said remote control module means,
   said central controller means and each of said remote control module means each comprising
      means for generating a start bit at the beginning of a message having a non-integral time duration as compared to a time period allotted for a data bit, and,
      detection means for distinguishing the start bit from data bits.

2. The system of claim 1 wherein said remote control module means comprises means for generating a start bit wherein said portion is 1⅜ the length of a data bit time period.

3. The system of claim 2 wherein said remote control module means comprises means for generating a start bit which has a first signal value of a length which is 1⅛ the length of a data bit time period, a second signal value which is of the same length as a data bit time period and a third signal value which is 1⅛ the length of a data bit time period.

4. A data transmission system wherein a start bit denoting the beginning of a message has a duration which distinguishes itself from data bit time periods in said message, the system comprising:
   a pair of means including central controller means and remote control module means;
   communication means connecting said central controller means to said remote control module means for carrying messages generated by one of said pair of means to the other of said pair of means;
   said one of said pair of means including means for generating a start bit at the beginning of a message, said start bit having a time duration fractionally related to the time period allotted for a data bit so that the start bit can be easily distinguished from a data bit; and,
   the other of said pair of means having detection means for distinguishing the start bit from data bits.

5. The system of claim 4 wherein said remote control module means comprises means for generating a start bit wherein said portion is 1⅜ the length of a data bit time period.

6. The system of claim 5 wherein said remote control module means comprises means for generating a start bit which has a first signal value of a length which is 1⅛ the length of a data bit time period, a second signal value which is of the same length as a data bit time period and a third signal value which is 1⅛ the length of a data bit time period.

7. A data transmission system wherein a start bit denoting the beginning of a message has a duration which distinguishes itself from data bit time periods in said message, the system comprising:
   central controller means for transmitting and receiving messages;
   remote control module means for transmitting and receiving messages;
   communication means connecting said central controller means to said remote control module means for carrying said messages between said central controller means and said remote control module means,
   said central controller means and each of said remote control module means each comprising
      means for generating a start bit at the beginning of a message, said start bit having a total duration of 3⅜ the length of a time period allotted to a data bit so that said start bit can be distinguished from a data bit, and,
   detection means for distinguishing the start bit from data bits.

8. A data transmission station wherein a start bit denoting the beginning of a message has a duration which distinguishes itself from a time period allotted for data bits, the station comprising:
   terminal means for connection to a transmission channel; and,
   communication means connected to said terminal means for supplying to said terminal means messages generated by said communication means, said messages including a start bit at the beginning of each message, said start bit having a time duration fractionally related to the time period allotted for a data bit so that the start bit can be easily distinguished from a data bit.

9. The station of claim 8 wherein said communication means comprises means for generating a start bit having at least a portion which is 1½ the length of a data bit time period.

10. The station of claim 9 wherein said communication means comprises means for generating a start bit which has a first signal value of a length which is 1½ the length of a data bit time period, a second signal value which is of the same length as a data bit time period, and a third signal value which is 1½ the length of a data bit time period.

* * * * *